United States Patent
Östreich et al.

(10) Patent No.: US 10,345,334 B2
(45) Date of Patent: Jul. 9, 2019

(54) ELECTRONIC ARRANGEMENT IN A MOTOR VEHICLE

(71) Applicants: Christian Östreich, Gründau (DE); Atsushi Murakami, Frankfurt (DE); Michael Kutzner, Sulzbach (DE); Holger Wahl, Hünstetten (DE)

(72) Inventors: Christian Östreich, Gründau (DE); Atsushi Murakami, Frankfurt (DE); Michael Kutzner, Sulzbach (DE); Holger Wahl, Hünstetten (DE)

(73) Assignee: Continental Teves AG & Co. oHG, Frankfurt (DE)

(*) Notice: Subject to any disclaimer, the term of this patent is extended or adjusted under 35 U.S.C. 154(b) by 0 days.

(21) Appl. No.: 15/602,459

(22) Filed: May 23, 2017

(65) Prior Publication Data

US 2018/0128852 A1 May 10, 2018

Related U.S. Application Data

(63) Continuation of application No. PCT/EP2015/070586, filed on Sep. 9, 2015.

(30) Foreign Application Priority Data

Nov. 24, 2014 (DE) .................. 10 2014 223 895

(51) Int. Cl.
| | |
|---|---|
| *G01D 3/08* | (2006.01) |
| *G01P 1/07* | (2006.01) |
| *H04Q 9/00* | (2006.01) |
| *G01D 21/00* | (2006.01) |
| *G01P 21/02* | (2006.01) |
| *G08C 19/02* | (2006.01) |
| *B60R 16/023* | (2006.01) |

(52) U.S. Cl.
CPC ............ *G01P 21/02* (2013.01); *G01D 3/08* (2013.01); *G01D 21/00* (2013.01); *G01P 1/07* (2013.01); *G08C 19/02* (2013.01); *H04Q 9/00* (2013.01); *B60R 16/0231* (2013.01); *H04Q 2209/823* (2013.01)

(58) Field of Classification Search
CPC .. G01P 21/02; G01P 1/07; H04Q 9/00; H04Q 2209/823; G01D 21/00; G01D 3/08; G08C 19/02; B60R 16/0231
USPC ......... 701/1, 36; 702/188–189; 340/650–654
See application file for complete search history.

(56) References Cited

U.S. PATENT DOCUMENTS

2016/0320441 A1* 11/2016 Du ................. G01R 31/025

FOREIGN PATENT DOCUMENTS

| DE | 19634715 A1 | 3/1998 |
|---|---|---|
| DE | 102004026594 A1 | 3/2005 |

(Continued)

OTHER PUBLICATIONS

German Search Report dated Nov. 20, 2015 for corresponding German application No. 10 2014 223 895.1.

(Continued)

*Primary Examiner* — Jonathan M Dunlap

(57) ABSTRACT

An electronic arrangement in a motor vehicle, in which at least one sensor is connected to a first electronic control unit by a current interface for transmitting signals and/or for supplying power. A connection of the current interface to at least one supply potential is provided via a second electronic control unit.

4 Claims, 1 Drawing Sheet

(56) References Cited

FOREIGN PATENT DOCUMENTS

| DE | 102004028509 A1 | 7/2005 |
| DE | 102012218274 A1 | 4/2014 |
| EP | 0387601 A1 | 9/1990 |
| EP | 2106008 A2 | 9/2009 |
| EP | 2106008 A3 * | 1/2018 |
| WO | 9809173 A1 | 3/1998 |
| WO | 02090999 A1 | 11/2002 |
| WO | 2014056683 A1 | 4/2014 |

OTHER PUBLICATIONS

International Search Report and Written Opinion dated Nov. 13, 2015 from corresponding International Patent Application No. PCT/EP2015/070586.
Korean Office Action dated Apr. 24, 2018 for corresponding Korean application No. 10-2017-7013927.
Chinese Office Action dated Oct. 24, 2018 for corresponding Chinese application No. 201580063509.3.

* cited by examiner

ELECTRONIC ARRANGEMENT IN A MOTOR VEHICLE

CROSS REFERENCE TO RELATED APPLICATIONS

This application claims the benefit of International application No. PCT/EP2015/070586, filed Sep. 9, 2015, which claims the benefit of German patent application No. 10 2014 223 895.1, filed Nov. 24, 2014, each of which are hereby incorporated by reference herein.

TECHNICAL FIELD

The present invention relates to an electronic arrangement in a motor vehicle.

BACKGROUND

International patent application publication WO 98/09173 discloses an active wheel-speed sensor for transmitting the rotational speed information from a motor vehicle wheel to the electronic controller of a braking system. The wheel-speed signal is transmitted in the form of rectangular pulses to the controller via a current interface. The current transmitted via the interface simultaneously provides the electrical power supply for the active sensor, with the result that only two lines are needed for connecting sensor and controller.

The vehicles of today comprise a multiplicity of electronic control units, which process sensor-based information. There are various approaches to signal processing in order to provide a plurality of these control units with the information from a sensor such as, for example, a wheel-speed sensor having current interface, for instance approaches such as CAN, FlexRay or interface emulation by simulating a sensor signal at the hardware level, in which approach a signal that simulates the operation of a sensor is generated in a controller. The times resulting therefrom for transmitting the information to the individual control units have a detrimental effect on the response times of the vehicle systems that process this information. Shortest possible response times, for instance in hazardous situations, are sometimes imperative for safety-related motor vehicle systems in particular.

Thus, it is desirable to provide an electronic arrangement in a motor vehicle that allows reduced response times of motor vehicle systems.

BRIEF SUMMARY

An electronic arrangement in a motor vehicle includes a sensor connected to a first electronic control unit by a current interface for transmitting signals and/or for supplying power. In one exemplary embodiment, the sensor may be an active sensor. In one exemplary embodiment, a connection of the current interface to at least one supply potential is provided via a second electronic control unit.

This implementation advantageously facilitates the connection of sensors having a current interface, e.g., wheel-speed sensors, to at least two different electronic control units, thereby allowing reduced response times of motor vehicle systems because the sensor information is provided to the control units almost simultaneously. In addition, the implementation requires only minor or no modifications to the control units, in particular to the second control unit. The sensor transmits to the electronic control units by means of the current interface, rotational speed information in the form of current pulses that are spaced in time according to the rotational speed. The current transmitted via the interface also provides the electrical power supply for the sensor.

According to an exemplary embodiment, the first electronic control unit comprises a monitoring mechanism for detecting a fault in the connection to the supply potential, which connection is implemented via the second electronic control unit. Said fault may be, for example, a complete disconnection of a potential or a variation in potential lying outside a tolerance range. One advantage thereof is that a fault in the connection of the current interface of the sensor to the connected supply potential(s) can be detected and, for example, relevant fault information can be output for notifying the vehicle driver.

The first control unit may comprise at least one switching element and/or at least one functional module for the connection to the supply potential, the connection of which supply potential is implemented via the second electronic control unit. On a fault being detected in the connection to the supply potential (KL30, KL31, GND), which connection is implemented via the second electronic control unit, a connection to this supply potential is made by the first electronic control unit. This ensures that the sensor continues to function despite a fault occurring. If the second electronic control unit is connected to a data bus, for example CAN or FlexRay, then in the event of a fault in the potential connection, the sensor information may be provided by this data bus, whereby the second electronic control unit may advantageously continue to process the information. In particular, the data processing can take account of the altered response times arising in this context.

According to an exemplary embodiment, the first electronic control unit and the second electronic control unit each comprise at least one measuring mechanism for acquiring signals from the sensor. Thus, the sensor information provided practically simultaneously to the control units can advantageously be acquired separately by each control unit.

The second electronic control unit may provide a connection to a reference potential of the motor vehicle.

Techniques for improving the electromagnetic compatibility are advantageously provided. The interference immunity of the sensor can thus advantageously remain practically unchanged compared with the sole connection to the first control unit.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
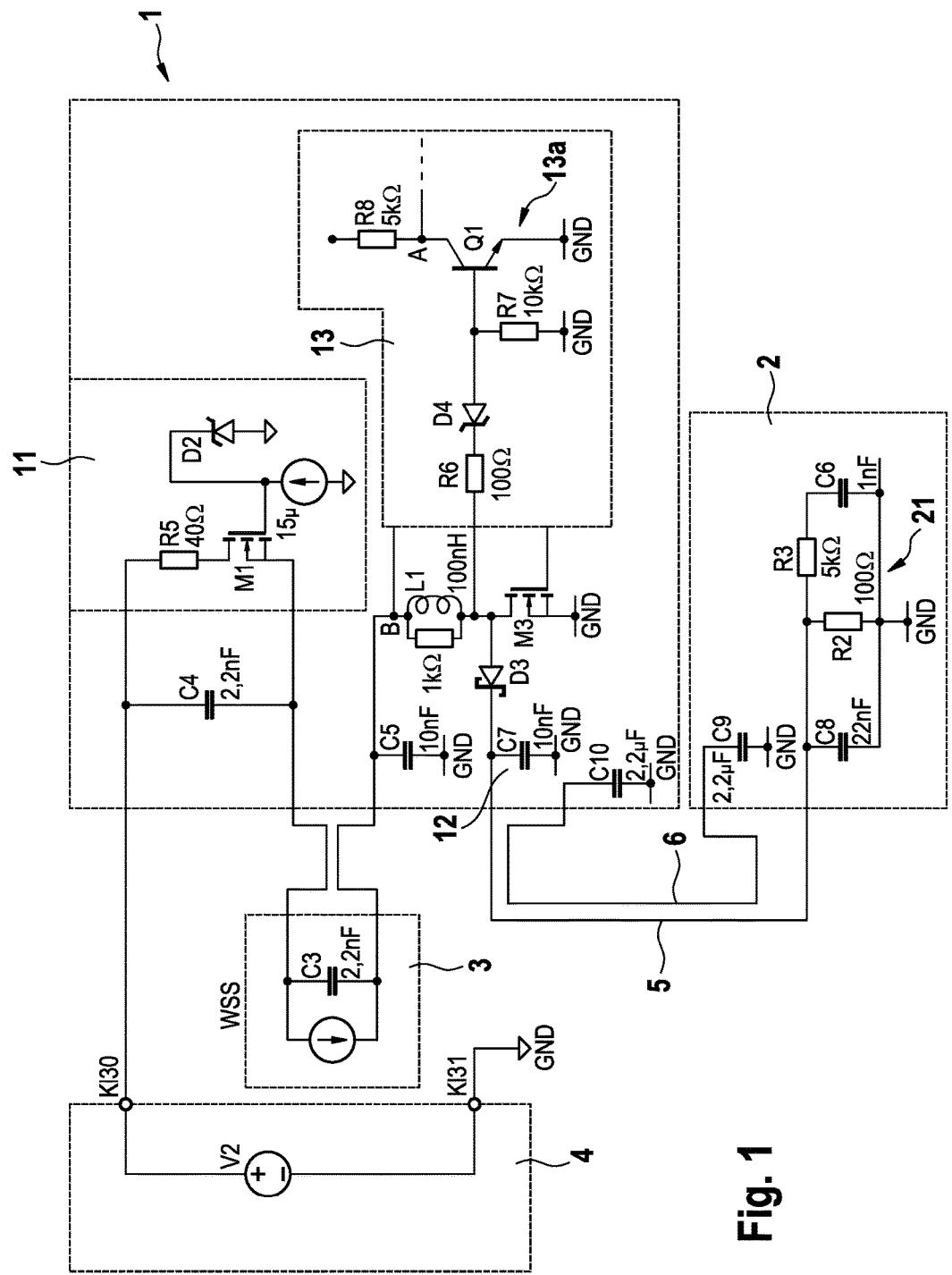
FIG. 1 is an electrical schematic diagram of an electronic arrangement for a vehicle according to one exemplary embodiment.

FIG. 1 shows schematically an exemplary embodiment of the electronic arrangement, wherein a wheel-speed sensor 3 is connected to a supply potential of a power source 4 via a second electronic control unit 2.

According to the exemplary embodiment of FIG. 1, the wheel-speed sensor 3 is connected to a first electronic control unit 1 by a current interface. As opposed to a connection to the reference potential GND (e.g., terminal 31, Kl31) of power source 4 made in the first electronic control unit 1, the connection to the reference potential GND is made in the second electronic control unit 2, with the reference-potential connection being taken to the second control unit 2 by an additional plug contact via line 5 of a cable harness, for instance. For example, the first electronic control unit 1 is the electronics of an electro-hydraulic motor-vehicle braking controller, and the second electronic control unit 2 is electronics of an electronically operable braking force booster, also known as an e-booster. The control units 1 and 2 are supplied with power by a power source 4, which, in the exemplary embodiment, is a vehicle battery.

For the purpose of evaluating the signals provided by the wheel-speed sensor 3, the first control unit 1 includes, on the positive potential side (e.g. Kl30), a measuring mechanism 11 for measuring the signals generated by the wheel-speed sensor 3. In the second control unit 2, a measuring mechanism 21, for example comprising additional filter devices, is provided for acquiring the signals generated by the wheel-speed sensor 3.

A monitoring mechanism 13, which is provided in the first control unit 1, is used to detect a break in the connection of wheel-speed sensor 3 to the reference potential GND. On such a fault occurring, a connection is made to the reference potential GND in the first control unit 1, thereby allowing wheel-speed sensor 3 to continue to function in the event of breaks arising in the further path of the reference-potential connection. Switch M3, e.g., a MOSFET, is used in the exemplary embodiment to make a connection to the reference potential GND, with the break being detected by measuring the current and/or the voltage at the measurement point B. In order to prevent wheel-speed sensor 3 from not being operational in the time interval between break in the reference-potential connection and switchover of switch M3, circuit 13a may be used to receive the current in this period. According to this combined embodiment, switch M3 is additionally used to avoid a higher voltage drop across circuit 13a, which is advantageous with regard to the capability of evaluating the levels of the current values from wheel-speed sensor 3. Since circuit 13a and switch M3 implement a connection to the reference potential, these can alternatively be provided independently or according to the described combined embodiment. A break in the connection can be detected in circuit 13a by measuring the voltage at the measurement point A, for example. In the event of a break in the reference-potential line, monitoring mechanism 13 preferably additionally outputs corresponding fault information. In order to compensate for the additional voltage drops, for example caused by circuit 13a, an increased supply voltage of the wheel sensor supply can be provided for a break in the connection to the reference potential and/or supply potential, which increase can be implemented, for example, by means of a boost converter and/or ground offset.

Since often it is only by using additional EMC measures that the wheel-speed sensors used have the required interference immunity, the cabling for the wheel-speed sensors is preferably in twisted form in the vehicle, which can reduce the electromagnetic interference. The consequence, however, of a direct one-sided potential connection to the second electronic control unit, omitting the first electronic control unit 1, would be that in this case the leads of the sensor 3 can be twisted to a limited extent and therefore additional means must be provided to maintain or to improve the electromagnetic compatibility according to this embodiment. In addition, the availability of sensor 3 would be impaired, which is often undesirable from the safety-related view.

In order to achieve improved electromagnetic compatibility, a capacitor 12 is provided in control unit 1 in parallel with the current path of the reference potential line 5, thereby achieving greater immunity to incident RF radiation or RF coupling-in. As an additional measure for improving the electromagnetic compatibility, line 6 may be provided, connected to capacitors C9 and C10, which is preferably twisted with line 5. Alternatively or additionally, further EMC protection measures such as filter circuits, for example, can be provided in the electronic control unit 1 or 2.

The arrangement may also be implemented such that as an alternative to the connection of the reference potential in the second control unit 2, a connection is made to the positive potential side in the second control unit 2, and a corresponding potential line is taken from the first control unit to the second control unit, with the reference-potential connection being implemented in the first control unit. Furthermore, additional electronic control units can be provided, which are connected accordingly to the reference-potential line and/or positive potential line, with the connection to the relevant potential being made in a terminating electronic control unit.

Circuit details or values shown in FIG. 1 shall be understood to be purely by way of example and can be replaced by functional modules that are substantially equivalent.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

The invention claimed is:

1. An electronic arrangement in a motor vehicle, comprising:
   at least one sensor connected to a first electronic control unit by a current interface for transmitting signals and/or for supplying power;
   wherein a connection of the current interface to at least one supply potential is provided via a second electronic control unit;
   wherein the first electronic control unit comprises a monitoring mechanism for detecting a fault in the connection to the supply potential, which connection is implemented via the second electronic control unit;
   wherein the first electronic control unit comprises at least one switching element and/or at least one functional module for the connection to the supply potential, the connection of which supply potential is implemented via the second electronic control unit;
   wherein in response to the fault being detected in the connection to the supply potential, which connection is implemented via the second electronic control unit, a connection to this supply potential is made by the first electronic control unit.

2. The electronic arrangement as claimed in claim 1, wherein the first electronic control unit and the second electronic control unit each comprise at least one measuring mechanism for acquiring signals from the sensor.

3. The electronic arrangement as claimed in claim 1, wherein the second electronic control unit provides a connection to a reference potential of the motor vehicle.

4. The electronic arrangement as claimed in claim 1, wherein the sensor is an active sensor.

\* \* \* \* \*